(12) United States Patent
Ichikawa et al.

(10) Patent No.: US 7,657,847 B2
(45) Date of Patent: Feb. 2, 2010

(54) COPY CONTROL INFORMATION DECIDING APPARATUS

(75) Inventors: Kei Ichikawa, Osaka (JP); Minoru Umesako, Hyogo (JP)

(73) Assignee: Panasonic Corporation, Osaka (JP)

( * ) Notice: Subject to any disclaimer, the term of this patent is extended or adjusted under 35 U.S.C. 154(b) by 440 days.

(21) Appl. No.: 11/628,491

(22) PCT Filed: May 16, 2005

(86) PCT No.: PCT/JP2005/008908

§ 371 (c)(1),
(2), (4) Date: Dec. 5, 2006

(87) PCT Pub. No.: WO2005/121978

PCT Pub. Date: Dec. 22, 2005

(65) Prior Publication Data

US 2008/0092080 A1      Apr. 17, 2008

(30) Foreign Application Priority Data

Jun. 9, 2004     (JP)     ............................. 2004-171708

(51) Int. Cl.
   *G06F 3/00*     (2006.01)
   *H04L 9/00*     (2006.01)

(52) U.S. Cl. ...................... 715/838; 715/810; 715/835; 705/57; 380/201; 380/231

(58) Field of Classification Search ................. 715/716, 715/719, 764, 765, 810, 835, 838, 205; 713/176; 382/100, 112; 380/51, 55, 201, 203, 231, 380/233, 239; 705/57
See application file for complete search history.

(56) References Cited

U.S. PATENT DOCUMENTS

| 6,823,075 | B2 * | 11/2004 | Perry .......................... 382/100 |
| 7,508,940 | B2 * | 3/2009 | Kato et al. ................... 380/200 |
| 2002/0073214 | A1 | 6/2002 | Iinuma |
| 2002/0152262 | A1 * | 10/2002 | Arkin et al. .................. 709/202 |
| 2002/0186394 | A1 | 12/2002 | Shiozaki et al. |
| 2003/0154377 | A1 * | 8/2003 | Hirai et al. ................... 713/176 |
| 2004/0027393 | A1 | 2/2004 | Kato et al. |
| 2004/0215965 | A1 * | 10/2004 | Tokuda et al. ................ 713/176 |
| 2006/0120525 | A1 * | 6/2006 | Van Wie et al. ............. 380/232 |

FOREIGN PATENT DOCUMENTS

EP     1 202 149     5/2002

(Continued)

*Primary Examiner*—X. L Bautista
(74) *Attorney, Agent, or Firm*—Wenderoth, Lind & Ponack, L.L.P.

(57) ABSTRACT

The copy control information deciding apparatus includes: a thumbnail obtaining unit 9 which obtains plural pieces of individual control information which are respective pieces of copy control information of plural scaled-down images which are displayed in a menu simultaneously; a copy control information deciding unit 11 which decides a piece of representative control information which is a piece of the copy control information of a menu display image in which the plural scaled-down images are displayed as a menu; and an output unit 14 which outputs the piece of representative control information decided by the copy control information deciding unit 11, in relation to the menu display image.

13 Claims, 11 Drawing Sheets

FOREIGN PATENT DOCUMENTS

| | | |
|---|---|---|
| JP | 2001-78140 | 3/2001 |
| JP | 2002-132999 | 5/2002 |
| JP | 2003-022610 | 1/2003 |
| JP | 2003-058429 | 2/2003 |
| JP | 2003-092725 | 3/2003 |
| JP | 2003-271437 | 9/2003 |

* cited by examiner

COPY CONTROL INFORMATION DECIDING APPARATUS

BACKGROUND OF THE INVENTION

1. Technical Field

The present invention is related to a copy control information deciding apparatus for deciding a piece of copy control information which controls copying of an image.

2. Background Art

In recent years, apparatuses which record and reproduce Audio Visual contents in a Digital Versatile Disc (DVD) or a Hard Disk Drive (HDD) have appeared. These apparatuses can record many contents. Thus, when a recorded content is to be reproduced, the function which presents a menu of the contents for a user in an easily understandable manner and which allows the user to select which content is to be reproduced is important. One of the examples of this function is a still image thumbnail navigation function. The still image thumbnail navigation function is a function which displays, on a single screen, thumbnails which are scaled-down images of still images that respectively represent the contents.

FIG. 1 is a diagram showing an overview of a content viewing system, when the still image thumbnail navigation function is activated in a conventional recording/reproducing apparatus. The operation of the conventional recording/reproducing apparatus is hereinafter described with reference to FIG. 1. The content viewing system is a system with which the user views a content and the like using the recording/reproducing apparatus.

In the system described in FIG. 1, a first recording/reproducing apparatus 21 which is a conventional recording/reproducing apparatus is connected to a television 2 and a second recording/reproducing apparatus 20. The first recording/reproducing apparatus 21 is an apparatus which records and reproduces a content. The television 2 is a display apparatus for displaying output data from the first recording/reproducing apparatus 21. The second recording/reproducing apparatus 20 is an apparatus which records signals, such as a signal of an image which is outputted from the first recording/reproducing apparatus 21, and the like. Note that the first recording/reproducing apparatus 21 operates based on an instruction transmitted from a remote control 22 operated by the user.

Identical signals are outputted from the first recording/reproducing apparatus 21 to the television 2 and the second recording/reproducing apparatus 20. In other words, the second recording/reproducing apparatus 20 can record signals of images identical to the images which are outputted from the first recording/reproducing apparatus 21 and displayed on the television 2.

The first recording/reproducing apparatus 21 includes a storage medium which stores contents, in which plural contents may be stored. Furthermore, image data of thumbnails which are scaled-down images representing each content are stored in an area different from the area where the content is stored.

The image data in a part of the content to be used as a thumbnail representing the part of the content can be automatically decided, or can be designated by the user.

Furthermore, copy control information which is information for protecting copyrights of respective image data are stored in the storage medium within the first recording/reproducing apparatus 21, together with the respective image data of each thumbnail. Each piece of the copy control information is one of "copy-free", "copy-one-generation" and "no-more-copies". In the substance data of a content, one of such piece of copy control information added to a frame extracted as a thumbnail is used as copy control information. Note that a frame is a minimal unit that constitutes a moving image.

Once activation of the still image thumbnail navigation function is instructed by the user's operation of the remote control 22, the first recording/reproducing apparatus 21 reads only thumbnail data from the storage medium, reproduces it, and displays a menu displaying the thumbnails on the television 2. With this operation, as shown in FIG. 1, a still image thumbnail navigation screen which is a menu display screen of thumbnails is displayed on the television 2.

Furthermore, six thumbnails are displayed simultaneously. In the case where the number of thumbnails to be displayed is over six, the remaining thumbnails incapable of being displayed are displayed by the user's operations, such as sequentially switching between the pages and scrolling the menu.

The user can select a thumbnail by operating an arrow key 22a of the remote control 22. For example, a cursor is put on a thumbnail 201 in FIG. 1, which indicates that the thumbnail 201 is selected. Note that the cursor is represented by a thick line which surrounds a thumbnail in the diagram.

In a state where one of the thumbnails is selected, the reproduction of the content corresponding to the selected thumbnail is started by pressing a reproduction key 22b of the remote control 22. Furthermore, the content corresponding to the selected thumbnail is deleted by pressing a deletion key 22c.

As described above, the still image thumbnail navigation function is a function which displays a menu displaying thumbnails each representing a content and which improves the convenience of the user's operations, such as reproducing and deleting a content.

Note that when data of still images is written in a DVD/audio disc, one recording method is disclosed in which a piece of copy control information is added to each still image (for example, refer to Japanese Laid-Open Patent Application No. 2001-78140 Publication).

BRIEF SUMMARY OF THE INVENTION

As described above, a piece of copy control information is added to each thumbnail. Therefore, there are cases where thumbnails having different copy control information are displayed on a menu display screen.

For example, the copy control information of a thumbnail 204 described in FIG. 1 is assumed to be "no-more-copies", and the copy control information of other thumbnails are assumed to be "copy-free".

Under this assumption, two types of copy control information "copy-free" and "no-more-copies" are added to the thumbnails on the single menu display screen. In this case, the aforementioned conventional recording/reproducing apparatus can not add a valid piece of copy control information to an image signal for displaying a menu display screen.

Thus, for example, although a thumbnail having the "no-more-copies" status is displayed on the menu display screen described in FIG. 1, the second recording/reproducing apparatus 20 can record display data of the menu display screen.

In other words, when the aforementioned conventional recording/reproducing apparatus outputs an image of a menu displaying plural thumbnails, the respective pieces of copy control information of the thumbnails are never considered, and as a result, the image is copied without authorization. In addition, when copying of the menu display image is totally prohibited in order to prevent free copying, even in the case where all thumbnails included in the menu display image have the "copy-free" status, the user can not copy the menu display image.

In view of the aforementioned problems, the object of the present invention is to provide a copy control information deciding apparatus for appropriately protecting a copyright of a menu display image in which plural scaled-down images respectively representing contents are simultaneously displayed as a menu.

The copy control information deciding apparatus of the present invention includes: a control information obtaining unit that obtains plural pieces of individual control information which are respective copy control information of plural scaled-down images which are displayed in a menu simultaneously; a deciding unit that determines representative control information which is the copy control information of a menu display image in which the plural scaled-down images are displayed as a menu, based on the plural pieces of individual control information obtained by the control information obtaining unit; and an output unit that outputs the representative control information determined by the deciding unit, in relation to the menu display image.

With this, the copy control information deciding apparatus of the present invention determines, as the copy control information of the menu display image in which plural scaled-down images are simultaneously displayed as a menu, a copy control information by considering respective pieces of individual control information included in the scaled-down images. Furthermore, it outputs the determined copy control information in relation to the menu display image. With this, it becomes possible to appropriately protect a copyright of the menu display image.

The present invention can provide, for example, a copy control information deciding apparatus for appropriately protecting a copyright of a menu display image which displays scaled-down images for allowing the user to select a content on which a processing such as reproduction is to be performed from among plural contents.

Furthermore, the present invention can be realized not only as a method having the characteristic units of the aforementioned copy control information deciding apparatus as steps, but also as a program including such steps, as a recording medium such as a CD-ROM, in which such a program is stored, and as an integrated circuit. Such a program can also be distributed via a transmission medium, such as a communication network.

NUMERICAL REFERENCES

Figure 1:
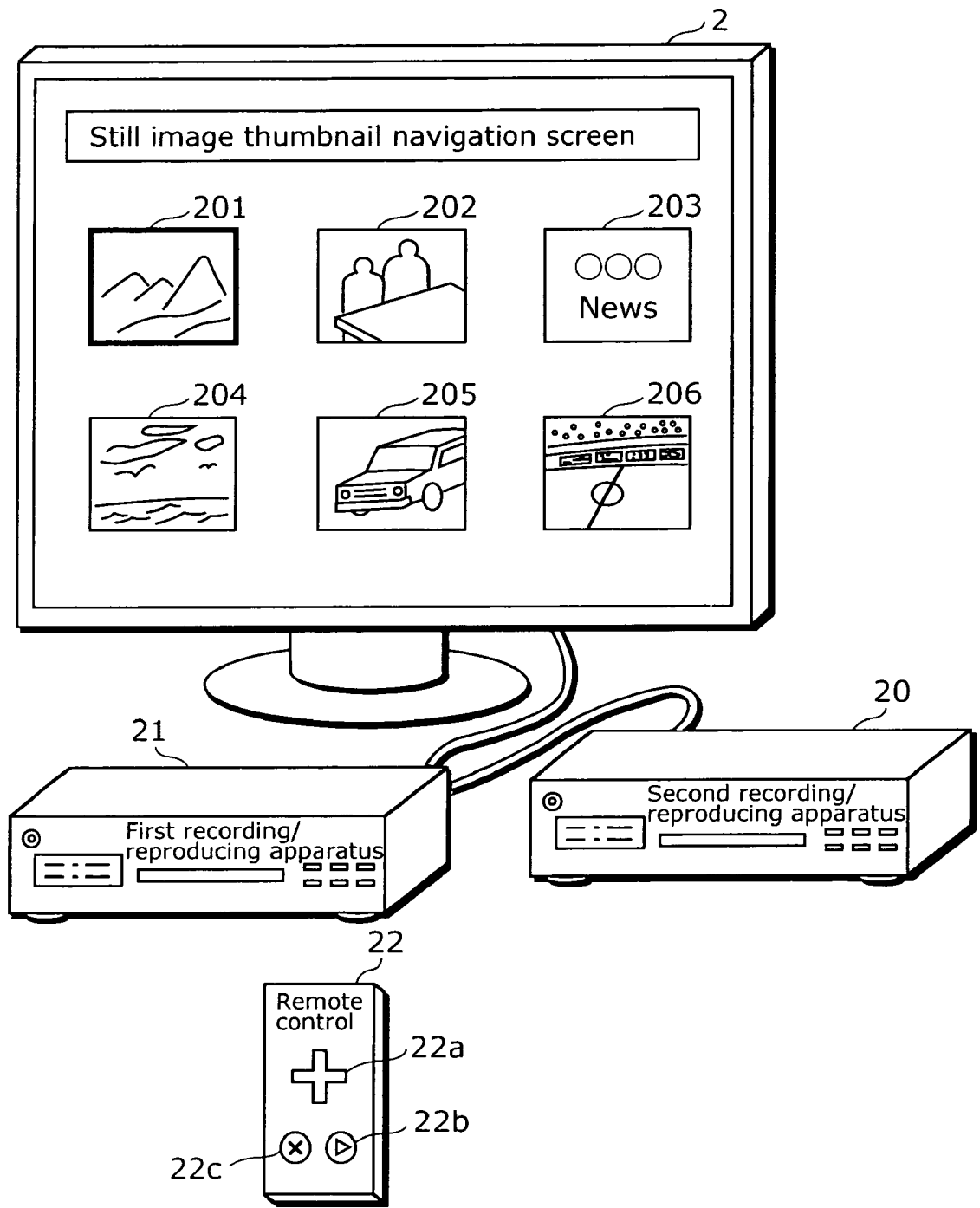
FIG. 1 is a diagram showing an overview of a content viewing system when the still image thumbnail navigation function is activated in the conventional recording/reproducing apparatus.

1 First recording/reproducing apparatus
2 Television
3 Remote control
4 Receiving unit
5 Control unit
6 Data receiving unit
7 Data processing unit
8 Content storing unit
9 Thumbnail obtaining unit
10 Menu generating unit
11 Copy control information deciding unit
12 Notification panel generating unit
13 Reproducing unit
14 Output unit
15 First output terminal
16 Second output terminal
20 Second recording/reproducing apparatus
60 Antenna

DETAILED DESCRIPTION OF THE INVENTION

The embodiments of the recording/reproducing apparatus of the present invention are described hereinafter with reference to the diagrams.

First Embodiment

Figure 2:
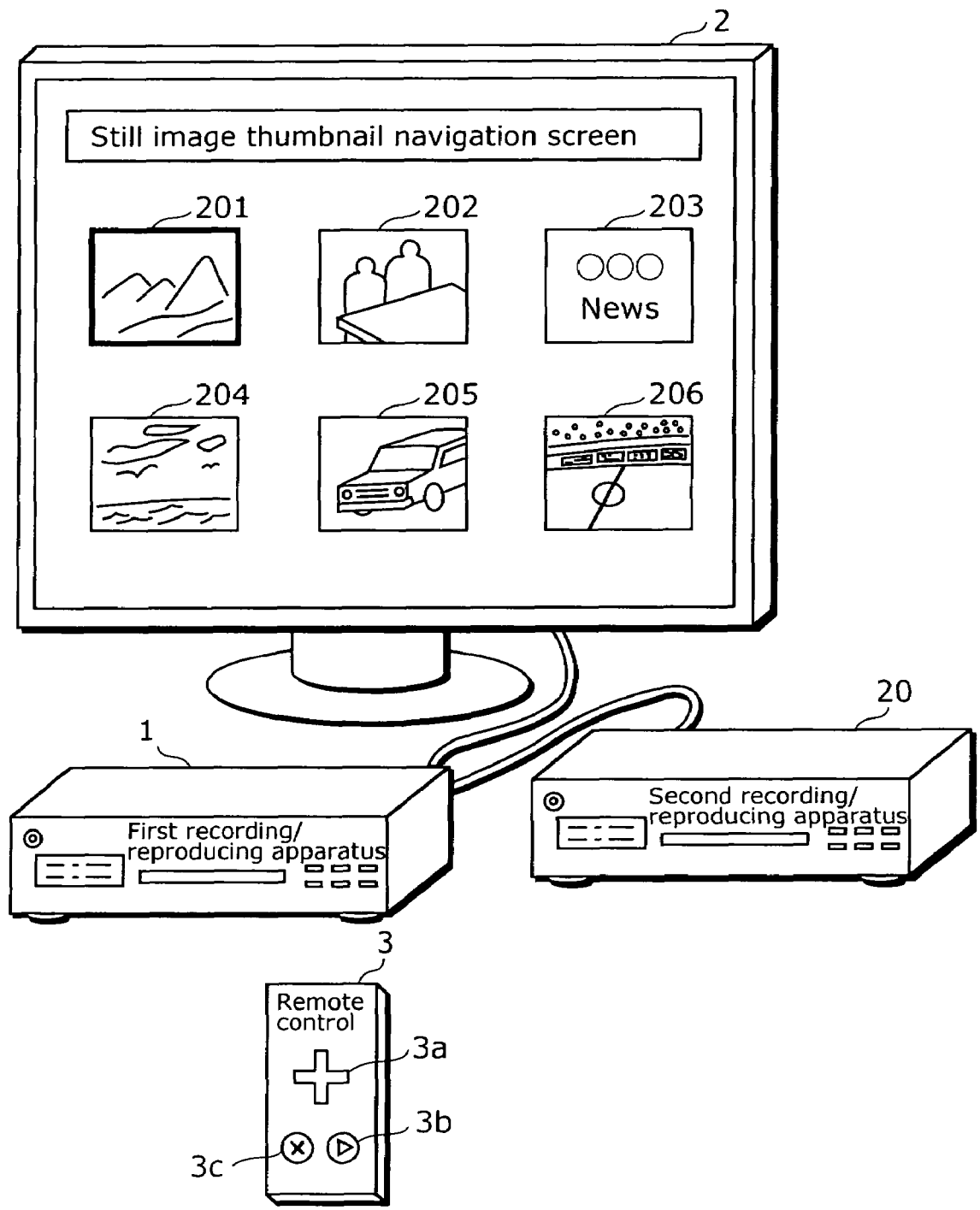
FIG. 2 is a diagram showing an overview of a content viewing system when the still image thumbnail navigation function is activated in the first recording/reproducing apparatus of the first embodiment of the present invention.

FIG. 2 is a diagram showing an overview of a content viewing system, when the still image thumbnail navigation function is activated in a first recording/reproducing apparatus 1 of the first embodiment of the present invention.

In the system described in FIG. 2, the first recording/reproducing apparatus 1 is connected to the television 2 and the second recording/reproducing apparatus 20. The first recording/reproducing apparatus 1 is an example of a copy control information deciding apparatus of the present invention, and an apparatus which records and reproduces contents. The television 2 is a display apparatus for displaying output data from the first recording/reproducing apparatus 1. The second recording/reproducing apparatus 20 is an apparatus which records signals, such as a signal of an image outputted from the first recording/reproducing apparatus 1, and the like.

Note that the first recording/reproducing apparatus 1 operates based on an instruction transmitted from a remote control 3 operated by the user. The remote control 3 includes an arrow key 3a, a reproduction key 3b, and a deletion key 3c which receive an instruction from the user. The operation of the first recording/reproducing apparatus 1 when the user presses each key is to be described hereinafter.

Furthermore, identical signals are outputted from the first recording/reproducing apparatus 1 to the television 2 and second recording/reproducing apparatus 20. In other words, the second recording/reproducing apparatus 20 can record a signal of an image identical to the image which has been outputted from the first recording/reproducing apparatus 1 and displayed on the television 2.

With a thumbnail navigation function in the first recording/reproducing apparatus 1, the television 2 displays a still image thumbnail navigation screen capable of displaying six thumbnails simultaneously. Note that a thumbnail is an example of a scaled-down image in the copy control information deciding apparatus of the present invention. In addition, an image of the still image thumbnail navigation screen is an example of a menu display image of the copy control information deciding apparatus of the present invention.

The still image thumbnail navigation screen includes six display areas for displaying thumbnails. The thumbnails 201 to 206 are displayed in each of the display areas.

As shown in FIG. 2, the overview of the content viewing system using the first recording/reproducing apparatus 1 is the same as the overview of the system using the conventional recording/reproducing apparatus described in FIG. 1.

However, with the functions of the units provided inside of the apparatus, the first recording/reproducing apparatus 1 can appropriately protect a copyright of an image in which plural scaled-down images representing the respective contents are simultaneously displayed.

Figure 3:
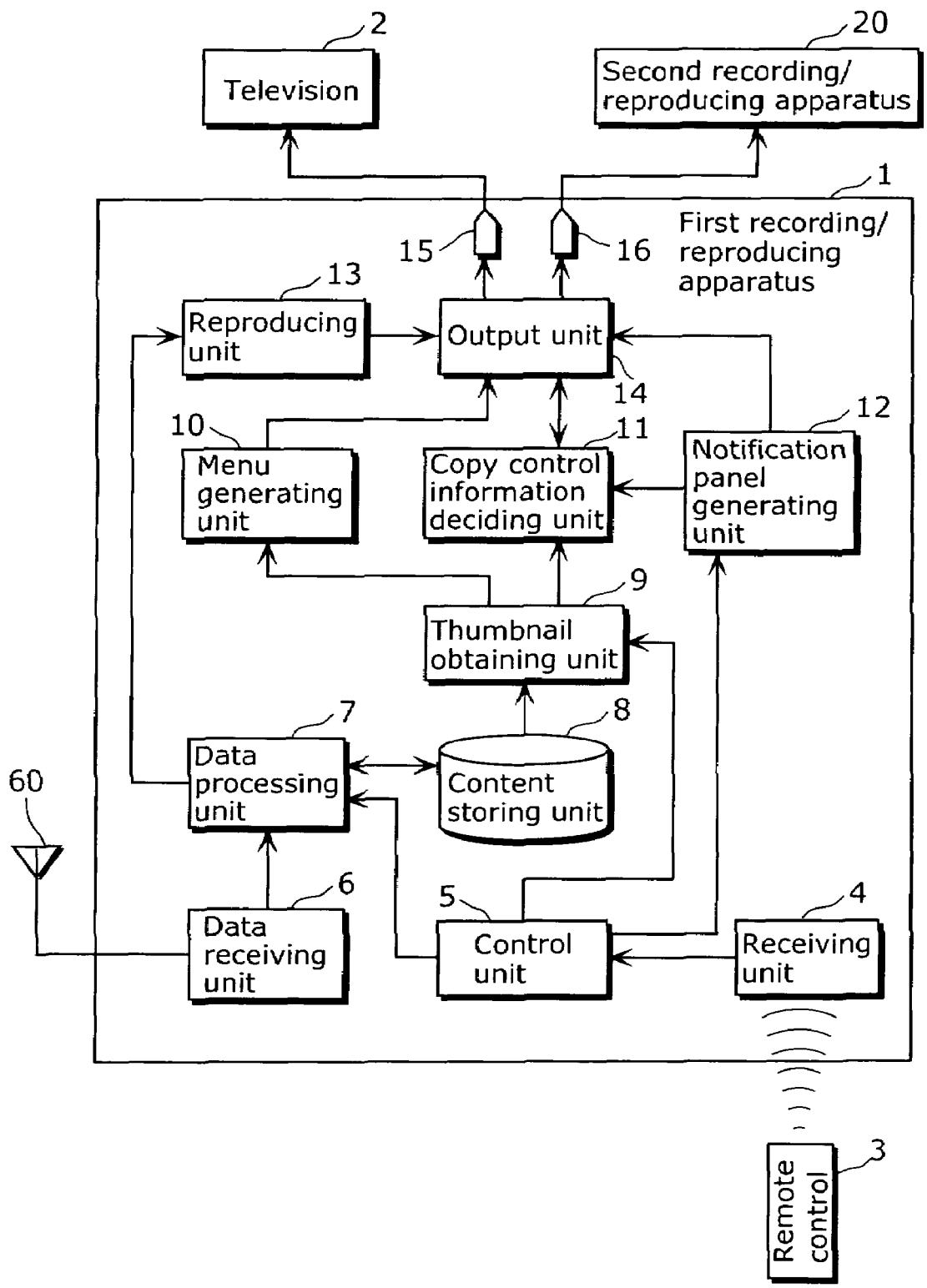
FIG. 3 is a functional block diagram showing the functional configuration of the first recording/reproducing apparatus 1 of the first and second embodiments of the present invention.

FIG. 3 is a functional block diagram showing the functional configuration of the first recording/reproducing apparatus 1. As shown in FIG. 3, the first recording/reproducing apparatus 1 includes a receiving unit 4, a control unit 5, a data receiving unit 6, a data processing unit 7, a content storing unit 8, a thumbnail obtaining unit 9, a menu generating unit 10, a copy control information deciding unit 11, a notification panel generating unit 12, a reproducing unit 13, an output unit 14, a first output terminal 15, and a second output terminal 16.

The receiving unit 4 is a processing unit which receives an instruction from the user which is transmitted from the remote control 3. The control unit 5 is a processing unit which controls the operation of the first recording/reproducing apparatus 1 based on the instruction from the user, and the like. The data receiving unit 6 is a processing unit which receives content data via an antenna 60.

The data processing unit 7 is a processing unit which manages the content data and performs processing, such as decoding or encoding the content data as necessary. The content storing unit 8 is a storage unit which stores content data. The thumbnail obtaining unit 9 is a processing unit which obtains, from the content data stored in the content storing unit 8, image data of a thumbnail and copy control information added to the image data of the thumbnail.

The menu generating unit 10 is a processing unit which generates an image signal of a still image thumbnail navigation screen which is a menu display screen that displays plural thumbnails simultaneously. The copy control information deciding unit 11 is a processing unit which determines the details of copy control information which should be added to an image signal of a still image thumbnail navigation screen. Note that the copy control information deciding unit 11 is an example of a deciding unit in the copy control information deciding apparatus of the present invention.

The notification panel generating unit 12 is a processing unit which generates a signal for displaying a panel which notifies a user of a state of the first recording/reproducing apparatus 1. The reproducing unit 13 is a processing unit which reproduces a content. The output unit 14 is an example of an output unit in the copy control information deciding apparatus of the present invention, and is a processing unit which outputs an image signal of the content, and the like. Furthermore, the output unit 14 also implements a function which obtains an image signal and is included in an image signal obtaining unit in the copy control information deciding apparatus of the present invention.

The first output terminal 15 and the second output terminal 16 are terminals for outputting a signal outputted from the output unit 14 to external apparatuses, such as a television. As shown in FIG. 3, the television 2 receives a signal outputted from the first output terminal 15, while the second recording/reproducing apparatus 20 receives a signal outputted from the second output terminal 16. The signal outputted from the first output terminal 15 and the second output terminal 16 is identical.

With the aforementioned configuration, the first recording/reproducing apparatus 1 can perform processing for appropriately protecting a copyright of an image of the still image thumbnail navigation screen which displays plural scaled-down images simultaneously.

Figure 4:
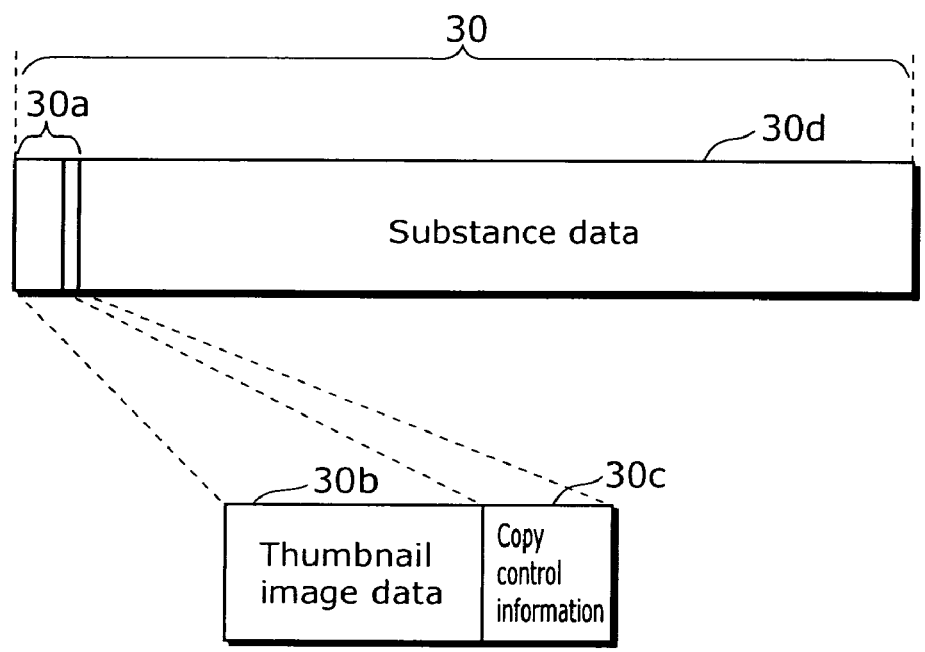
FIG. 4 is a diagram showing an example of a data configuration of content data.
Figure 5:
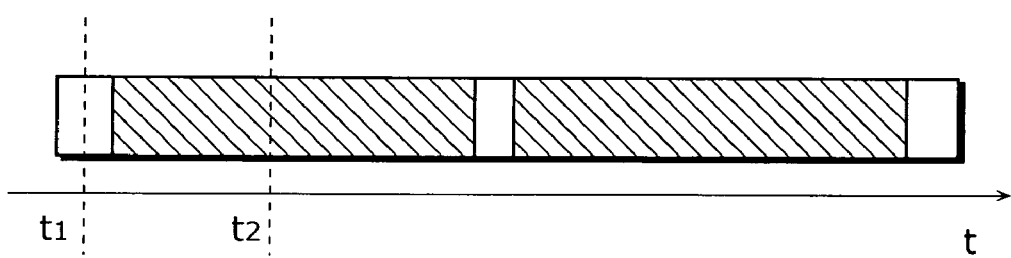
FIG. 5 is a diagram showing an example of temporal changes in the copy control information added to the substance data of the content.

The still image thumbnail navigation function is described in details with reference to FIG. 4 and FIG. 5. FIG. 4 is a diagram showing an example of a data configuration of content data. As shown in FIG. 4, content data 30 includes substance data 30d and thumbnail data 30a. The substance data 30d is data including information, such as images and audio that are substances of the content.

Furthermore, the thumbnail data 30a is data including thumbnail image data 30b and copy control information 30c. The thumbnail image data 30b is data of a still image of a frame extracted from image data included in the substance data 30d. The copy control information 30c is information for copy control added to the thumbnail image data 30b.

Note that as described above, each piece of copy control information is one of "copy-free", "copy-one-generation", and "no-more-copies". As this copy control information, copy control information added to a frame extracted as an image which becomes a thumbnail in the substance data of the content is used.

More specifically, copy control information is added per frame in the substance data of the content, and there are cases where the copy control information varies according to the reproduction of the content.

FIG. 5 is a diagram showing an example of temporal changes in the copy control information added to the substance data of the content according to the reproduction of the content.

In the diagram shown in FIG. 5, the horizontal axis indicates time (t). Furthermore, the diagonally shaded areas indicate "no-more-copies", and the rectangular areas other than the diagonally shaded areas indicate "copy-free".

For example, in the case where data of a frame at a t1 point in the substance data of the content is extracted and used as a piece of thumbnail image data, the copy control information added to the piece of thumbnail image data is "copy-free". In addition, in the case where data of a frame at a t2 point in the substance data of the content is extracted and used as a piece of thumbnail image data, the copy control information added to the thumbnail image data is "no-more-copies".

Note that the image data in a part of the content to be used as a thumbnail may be decided in advance, or can be automatically decided by the first recording/reproducing apparatus 1. Furthermore, it may be designated and decided by the user. These designation methods are not related to the present invention. In the first and second embodiments of the present invention, it is assumed that the image data to be used as a thumbnail is decided in advance, as shown in FIG. 4.

The content storing unit 8 in the first recording/reproducing apparatus 1 stores plural contents. More specifically, the content storing unit 8 stores plural pieces of content data having the data configuration shown in FIG. 4. In other words, the content storing unit 8 also stores plural pieces of thumbnail data.

Figure 6:
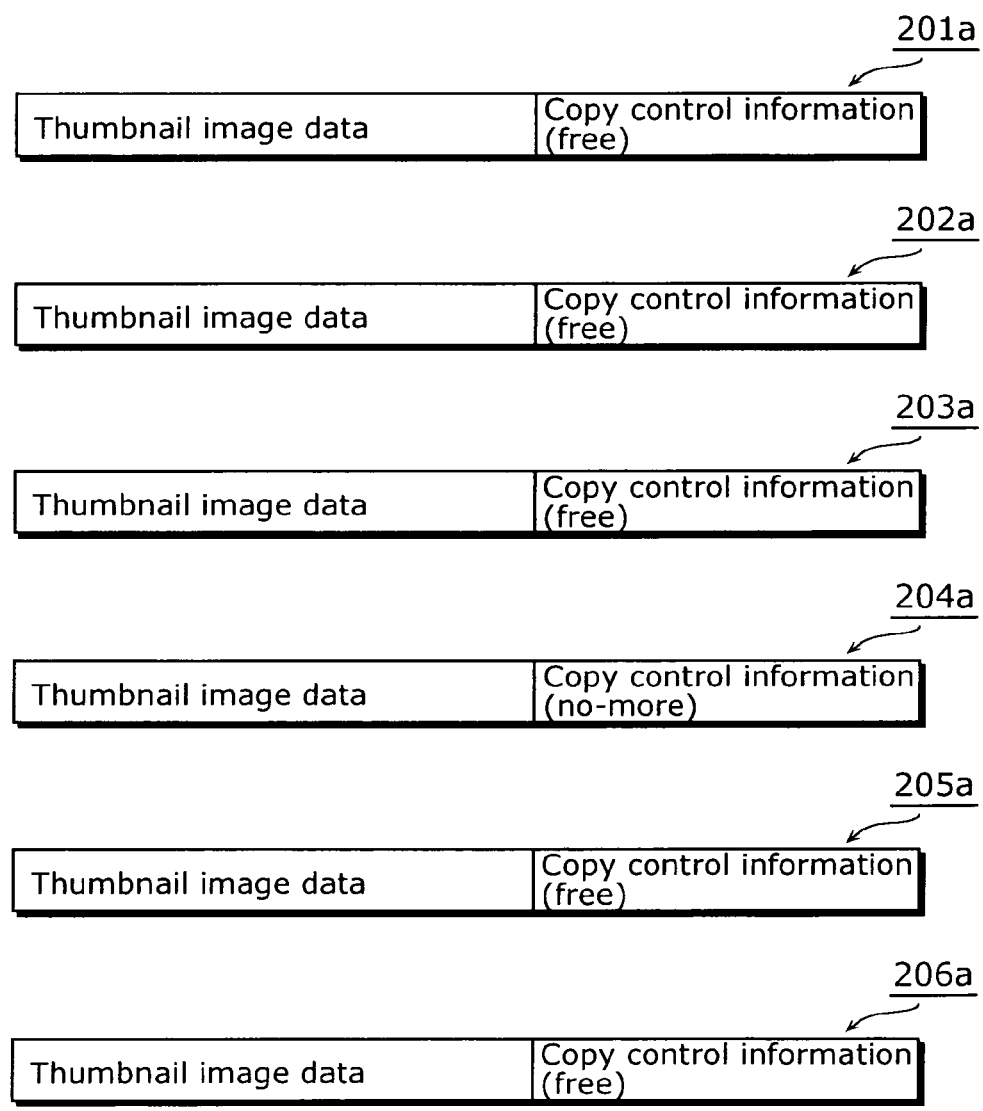
FIG. 6 is a diagram showing an example of plural pieces of thumbnail data stored in the content storing unit.

FIG. 6 is a diagram showing an example of the plural pieces of thumbnail data stored in the content storing unit 8.

The thumbnail data 201a to thumbnail data 206a shown in FIG. 6 correspond to the thumbnails 201 to 206 shown in FIG. 2 respectively. In addition, as described above, the content storing unit 8 stores the thumbnail data 201a to thumbnail data 206a together with respective pieces of the substance data of the content corresponding to the respective pieces of the thumbnail data.

Each piece of the thumbnail data includes thumbnail image data and copy control information. In addition, in each piece of copy control information, "free" stands for "copy-free", and "no-more" stands for "no-more-copies". As shown in FIG. 6, the thumbnail 204 only indicates "no-more-copies", while other thumbnails indicate "copy-free".

Once the still image thumbnail navigation function is activated by the user's operation of the remote control 3, the thumbnail obtaining unit 9 obtains the thumbnail data 201a to thumbnail data 206a from the content storing unit 8. The thumbnail obtaining unit 9 extracts respective pieces of thumbnail image data from each of the obtained thumbnail data, and transmits them to the menu generating unit 10.

The menu generating unit 10 generates an image signal for displaying a still image thumbnail navigation screen on the television 2 using the received thumbnail image data. The generated image signal is outputted to the output unit 14.

The output unit 14 outputs the received image signal to the television 2 via the first output terminal 15, while outputting it to the second recording/reproducing apparatus 20 via the second output terminal 16.

As a result of the output of the aforementioned image signal, as shown in FIG. 2, the still image thumbnail navigation screen is displayed on the television 2. On the still image thumbnail navigation screen, six thumbnails, the thumbnail 201 to the thumbnail 206 are displayed.

In the case where the number of the thumbnails stored in the content storing unit 8 is more than six, the user can display the remaining thumbnails incapable of being displayed by switching between the pages and scrolling the menu.

The user can select a thumbnail by operating an arrow key 3a of the remote control 3. For example, the still image thumbnail navigation screen shown in FIG. 2 indicates that a cursor is put on the thumbnail 201 and the thumbnail 201 is in a state of being selected.

In the case where some of the thumbnails are selected on the still image thumbnail navigation screen, when the user presses the reproduction key 3b of the remote control 3, a reproduction instruction is transmitted from the remote control 3 to the first recording/reproducing apparatus 1. The first recording/reproducing apparatus 1 starts the reproduction of a content corresponding to the thumbnail selected by the user, and outputs the image signal of the content to the television 2 and the second recording/reproducing apparatus 20. The television 2 starts the reproduction of the content on the whole screen.

More specifically, the substance data of the content corresponding to the thumbnail selected by the user is read by the data processing unit 7 which has received an instruction from the control unit 5, and is transmitted to the reproducing unit 13. The reproducing unit 13 reproduces the substance data of the content. The image signal of the reproduced substance data is outputted to the television 2 and the second recording/reproducing apparatus 20 via the output unit 14.

When some of the thumbnails are selected, in the case where the user presses the deletion key 3c of the remote control 3, the content corresponding to the selected thumbnail is deleted from the content storing unit 8.

More specifically, the data processing unit 7 which has received an instruction of the control unit 5 deletes the content data from the content storing unit 8.

As described above, the first recording/reproducing apparatus 1 displays a menu displaying the thumbnails which are plural scaled-down images representing the respective contents with the still image thumbnail navigation function. With this function, the convenience of the user's operations, such as reproducing and deleting a content is improved.

Here, when an image signal of a still image thumbnail navigation screen is outputted, the first recording/reproducing apparatus 1 determines copy control information for appropriately protecting a copyright of the still image thumbnail navigation screen. This copy control information is described hereinafter.

As described above, one of the following pieces of copy control information, "copy-free", "copy-one-generation", and "no-more-copies" is added to a thumbnail. The copyright protection function included in each piece of the copy control information becomes stronger in an order of "copy-free", "copy-one-generation", and "no-more-copies". Hereinafter, when the copy control information is defined as "strong", it indicates that the copyright protection function included in the copy control information is strong.

The first recording/reproducing apparatus 1 merges plural pieces of copy control information included in plural thumbnails which are displayed. Merging is to select the strongest copy control information among plural pieces of copy control information. In other words, the strongest copy control information among the displayed plural pieces of copy control information is determined as the copy control information added to the still image thumbnail navigation screen.

More specifically, the thumbnail obtaining unit 9 obtains thumbnail data from the content storing unit 8, and obtains the copy control information from the thumbnail data. In other words, the thumbnail obtaining unit 9 obtains individual control information in the copy control information deciding apparatus of the present invention. The thumbnail obtaining unit 9 transmits the copy control information to the copy control information deciding unit 11. The copy control information deciding unit 11 determines the strongest copy control information from among the plural pieces of copy control information received from the thumbnail obtaining unit 9, as the copy control information to be added to the image signal of the still image thumbnail navigation screen. In other words, the copy control information deciding unit 11 determines the representative control information in the copy control information deciding apparatus of the present invention.

Then, the copy control information is transmitted to the output unit 14. The transmitted copy control information is added to an image signal in the output unit 14, and then transmitted, together with the image signal, to the television 2 and the second recording/reproducing apparatus 20.

A combination example of the copy control information is described hereinafter when the copy control information deciding unit 11 determines the copy control information added to an image signal of a still image thumbnail navigation screen.

In the example of a screen display of the television 2 in FIG. 2, the thumbnail 204 has the "no-more-copies" status as copy control information, and other thumbnails have the "copy-free" status as the copy control information (refer to FIG. 6). In other words, the strongest copy control information is "no-more-copies". Thus, the copy control information "no-more-copies" is added to the image signal of the still image thumbnail navigation screen, and the image signal is outputted.

With this, although there is no effect on the display of the television 2, the second recording/reproducing apparatus 20 which is an output destination of an image signal can not record the image signal of the still image thumbnail navigation screen. As a result, it is possible to prevent the thumbnail 204 having the "no-more-copies" status from being copied.

As another combination example of the pieces of copy control information other than the case described above, for example, when two types of copy control information "copy-one-generation" and "copy-free" exist among plural pieces of copy control information of thumbnails, the strongest copy control information is "copy-one-generation". Thus, the copy control information "copy-one-generation" is added to an image signal, and the image signal is outputted. Furthermore, when plural pieces of copy control information of thumbnails are all "copy-free", the piece of copy control information "copy-free" is added to an image signal, and then the image signal is outputted.

In other words, the case where the image signal of the still image thumbnail navigation screen outputted from the first recording/reproducing apparatus 1 is recorded in the second recording/reproducing apparatus 20 is limited to the case where the respective copy control information added to plural pieces of thumbnail image data included in the image signal all indicate "copy-free".

Even when the combination of the respective copy control information of plural thumbnails is other than the aforementioned combinations, a single piece of copy control information is decided according to a similar rule.

Figure 7:
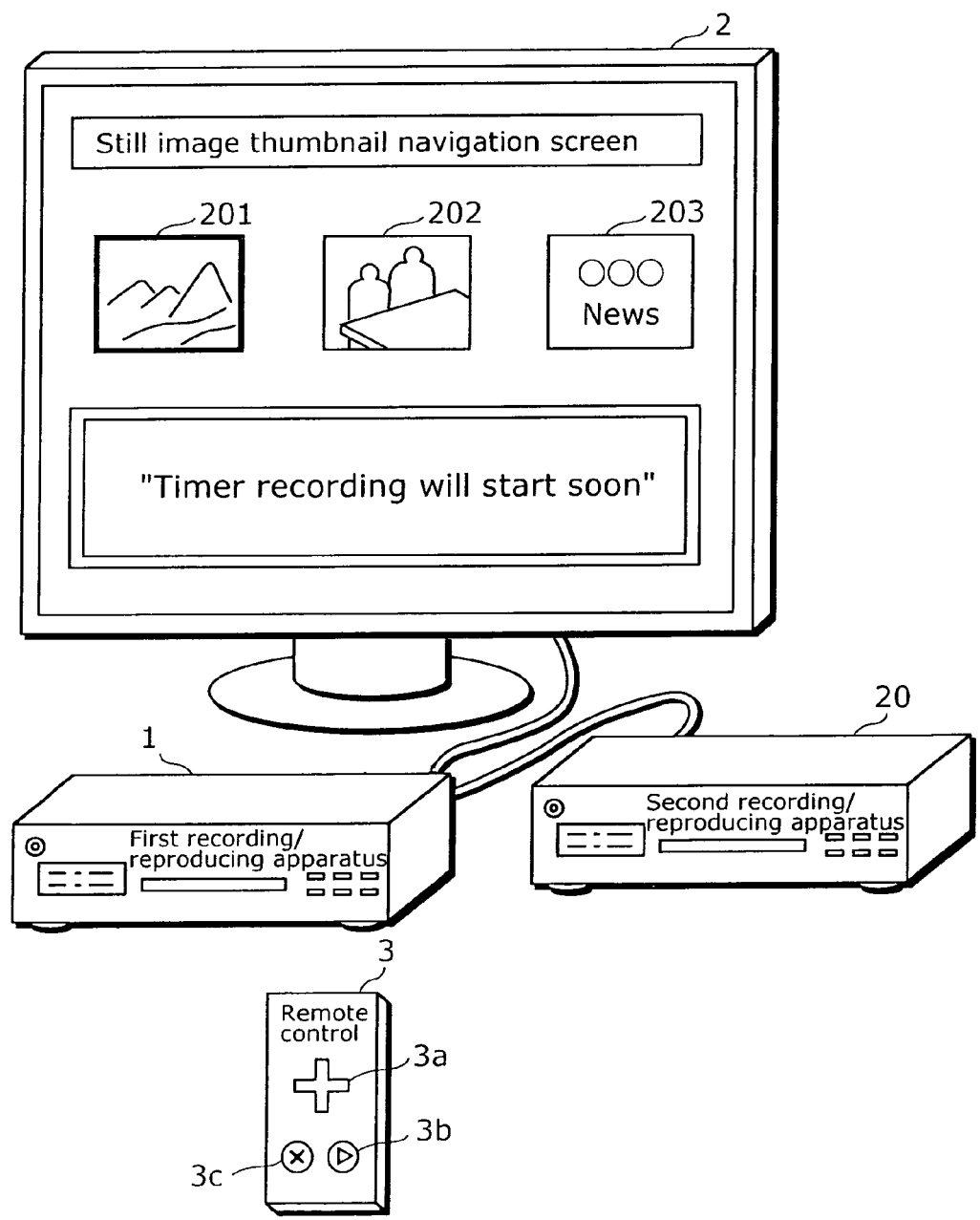
FIG. 7 is a diagram showing an example of an image display on a television in the case where a still image thumbnail navigation screen is displayed on which a notification panel is superimposed.

Next, the operation of the first recording/reproducing apparatus 1 in the case where a certain image is superimposed on the still image thumbnail navigation screen so as to cover thumbnails is described using FIG. 7.

FIG. 7 is a diagram showing an example of an image display on the television 2 in the case where the still image thumbnail navigation screen is displayed on which a notification panel is superimposed. Note that the notification panel is an example of a sub-image in the copy control information deciding apparatus of the present invention.

In the first recording/reproducing apparatus 1, the notification panel generating unit 12 generates an image signal of a notification panel for notifying a user of a result of the user's operation or an alarm from an apparatus, based on the instruction from the control unit 5. The output unit 14 superimposes the generated image signal of the notification panel on the image signal of the still image thumbnail navigation screen, and outputs it to the television 2 and second recording/reproducing apparatus 20.

For example, as shown in FIG. 7, in order to notify the user that the time to start a timer recording is approaching, the notification panel displaying that "Timer recording will start soon" is superimposed on a part of the still image thumbnail navigation screen and displayed thereon.

With this notification panel, the thumbnail which should be displayed is not displayed. For example, as shown in FIG. 7, the three thumbnails 204 to 206 are covered. In other words, the thumbnail image data included in the image signal outputted from the first recording/reproducing apparatus 1 is limited to three pieces of thumbnail image data of the thumbnails 201 to 203 in this state.

In such a screen display state, the copy control information added to an outputted image signal is described hereinafter.

As described above, the thumbnail image data of the thumbnails covered by a notification panel is not outputted. Therefore, there is no need to incorporate, into the outputted image signal, the copy control information added to the thumbnail image data of the covered thumbnails.

Thus, the copy control information deciding unit 11 only merges the copy control information of the thumbnails 201 to 203. As shown in FIG. 6, the copy control information added to the thumbnails 201 to 203 are all "copy-free". Thus, the copy control information deciding unit 11 determines "copy-free" to be the copy control information to be added to an image signal of a still image thumbnail navigation screen.

As a result, by outputting the image signal of the notification panel, the copy control information added to the image signal of the still image thumbnail navigation screen which is outputted to the external apparatus is changed from "no-more-copies" to "copy-free".

Thus, the first recording/reproducing apparatus 1 of the first embodiment can output an image signal which displays a menu displaying the thumbnails of the contents and to which the copy control information is added.

The copy control information added to the image signal is determined based on the respective pieces of copy control information added to the plural pieces of thumbnail image data included in the outputted image signal.

More specifically, among the plural pieces of copy control information, the strongest copy control information is selected and added to the image signal. With this, in the case where at least a single piece of thumbnail image data is "no-more-copies", the image signal including the piece of thumbnail image data becomes "no-more-copies". Therefore, the thumbnail image data with the "no-more-copies" status is never copied by an apparatus which is an output destination of the image data.

Furthermore, in the case where the piece of copy control information of at least a single piece of thumbnail image data is "copy-one-generation" and the respective pieces of copy control information of other pieces of thumbnail image data are "copy-free", the image signal including the piece of thumbnail image data becomes "copy-one-generation". Therefore, the piece of thumbnail image data with the "copy-one-generation" status is allowed to be copied once by an apparatus which is an output destination of the image data.

With such, the first recording/reproducing apparatus 1 of the first embodiment can appropriately protect a copyright of a menu display screen which simultaneously displays plural scaled-down images representing the respective contents.

Second Embodiment

The second embodiment is described with reference to FIGS. 8 to 10.

The first recording/reproducing apparatus 1 of the first embodiment is the apparatus which displays only thumbnails that are still images as a screen for making the user select a content. However, the first recording/reproducing apparatus 1 of the second embodiment has a function of displaying, with thumbnails, a scaled-down moving image generated by scaling down a moving image. This function of displaying the scaled-down moving image is referred to as a scaled-down moving image navigation function. Note that a scaled-down moving image is another example of a scaled-down image in the copy control information deciding apparatus of the present invention, and is a moving image which is scaled-down and displayed when it is displayed on a screen.

Figure 8:
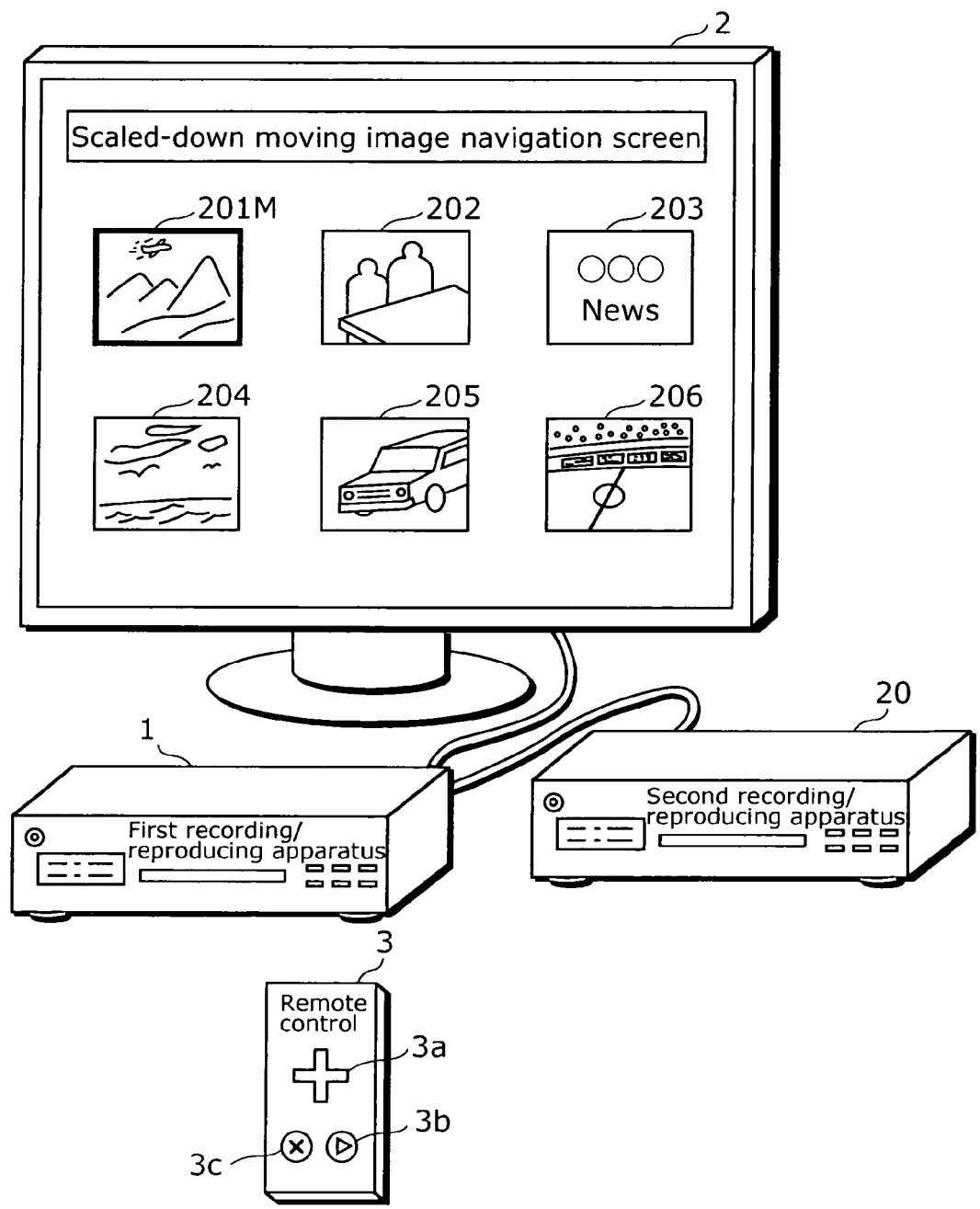
FIG. 8 is a diagram showing the overview of a content viewing system when the scaled-down moving image navigation function is activated in the first recording/reproducing apparatus 1 of the second embodiment of the present invention.

FIG. 8 is a diagram showing the overview of a content viewing system, when the scaled-down moving image navigation function is activated in the first recording/reproducing apparatus 1 of the second embodiment of the present invention.

As shown in FIG. 8, with the scaled-down moving image navigation function included in the first recording/reproducing apparatus 1, a scaled-down moving image navigation screen is displayed on the television 2. The image of the scaled-down moving image navigation screen is another example of a menu display image of the copy control information deciding apparatus of the present invention.

Note that the functional configuration of the first recording/reproducing apparatus 1 of the second embodiment is the same as the functional configuration of the first recording/reproducing apparatus 1 of the first embodiment shown in FIG. 2. However, the copy control information deciding unit 11, the reproducing unit 13, and the output unit 14 perform operations different from those of the first embodiment so that the scaled-down moving image navigation function can be implemented.

The scaled-down moving image navigation function is described hereinafter. Note that it is assumed that the content storing unit 8 stores content data including the thumbnail data 201*a* to thumbnail data 206*a* shown in FIG. 6.

When the user instructs the scaled-down moving image navigation function to be activated by the operation of the remote control 3, the thumbnail obtaining unit 9 obtains the thumbnail data 201*a* to thumbnail data 206*a* from the content storing unit 8. The thumbnail obtaining unit 9 extracts pieces of thumbnail image data from respective pieces of the obtained thumbnail data, and transmits them to the menu generating unit 10.

The menu generating unit 10 generates an image signal for displaying the scaled-down moving image navigation screen on the television 2 using the received thumbnail image data. The generated image signal is transmitted to the output unit 14.

The output unit 14 outputs the received image signal to the television 2 via the first output terminal 15, while outputs it to the second recording/reproducing apparatus 20 via the second output terminal 16.

With the operations up to this point, the image signal of the scaled-down moving image navigation screen for displaying only thumbnails having the same configuration as the still image thumbnail navigation screen described in the first embodiment is outputted and displayed on the television 2.

Here, a cursor is put on the thumbnail 201 in the initial display state of the scaled-down moving image navigation screen.

The data processing unit 7 reads, based on the instruction from the control unit 5, the substance data of the content corresponding to the thumbnail on which this cursor is put. In other words, the data processing unit 7 reads the substance data corresponding to the thumbnail data 201*a*. The read substance data is transmitted to the reproducing unit 13.

The reproducing unit 13 reproduces the substance data, converted it into moving image data which is scaled-down to a predetermined size, and transmits it to the output unit 14. The output unit 14 superimposes the moving image data on the image signal of the scaled-down moving image navigation screen, and outputs the image signal.

As a result of the aforementioned operation, a scaled-down moving image 201M which is a moving image of the content corresponding to the thumbnail 201 is reproduced in the same area as the display area of the thumbnail 201. In this case, audio of the content corresponding to the scaled-down moving image 201M is outputted.

In the case where the number of the contents stored in the content storing unit 8 is more than six, the user can display the remaining thumbnails incapable of being displayed by switching between the pages or scrolling the menu on the scaled-down moving image navigation screen.

The user can select a thumbnail by operating the arrow key 3*a* of the remote control 3. When some of the thumbnails are selected, the scaled-down moving images of the contents corresponding to the selected thumbnails are reproduced in the positions of the thumbnails.

With the aforementioned selection, when the reproduction key 3*b* of the remote control 3 is pressed, a reproduction instruction is transmitted from the remote control 3 to the first recording/reproducing apparatus 1. The first recording/reproducing apparatus 1 generates an image signal for displaying, on the whole screen, the content which has been selected by the user as the target of the reproduction of the scaled-down moving image, and outputs the signal to the television 2 and the second recording/reproducing apparatus 20. The television 2 starts the reproduction of the content on the whole screen.

More specifically, the data processing unit 7 which has received an instruction of the control unit 5 instructs the reproducing unit 13 to generate an image signal for displaying, on the whole screen, the content which has been selected by the user and is the target of the reproduction of the scaled-down moving image. The reproducing unit 13 generates the image signal for displaying the content on the whole screen, and outputs it to the output unit 14. The output unit 14 outputs the image signal to the television 2 and the second recording/reproducing apparatus 20.

Note in a state where some of the thumbnails are selected and the scaled-down moving images are displayed, when the user presses the deletion key 3*c* of the remote control 3, the contents corresponding to the selected thumbnails are deleted from the content storing unit 8.

More specifically, the data processing unit 7 which has received an instruction from the control unit 5 deletes, from the content storing unit 8, the contents which have been selected by the user and are the target of the reproduction of the scaled-down moving images.

As described above, with the scaled-down moving image navigation function, the first recording/reproducing apparatus 1 displays a menu of thumbnails which are plural scaled-down images of still images representing the respective contents. Furthermore, the first recording/reproducing apparatus 1 presents, to the user, the content corresponding to the thumbnail selected by the user. With this function, the convenience of the user's operations, such as reproducing and deleting a content is improved.

Here, the first recording/reproducing apparatus 1 determines copy control information for appropriately protecting a copyright of the scaled-down moving image navigation screen when the image signal of the scaled-down moving image navigation screen is outputted. This copy control information is described hereinafter.

As described above, one of the following pieces of copy control information, "copy-free" "copy-one-generation", and "no-more-copies" is added to a thumbnail. The piece of copy control information becomes stronger in an order of "copy-free", "copy-one-generation", and "no-more-copies". Such copy control information is obtained by the thumbnail obtaining unit 9, and is transmitted to the copy control information deciding unit 11.

Furthermore, the copy control information added to the substance data of the content which is reproduced as a scaled-down moving image varies in real time as the reproduction proceeds. More specifically, as described above, copy control information is added to each frame, which is a minimal unit that constitutes a moving image. Thus, as the frames are reproduced in order, the copy control information to be merged varies.

Figure 9:
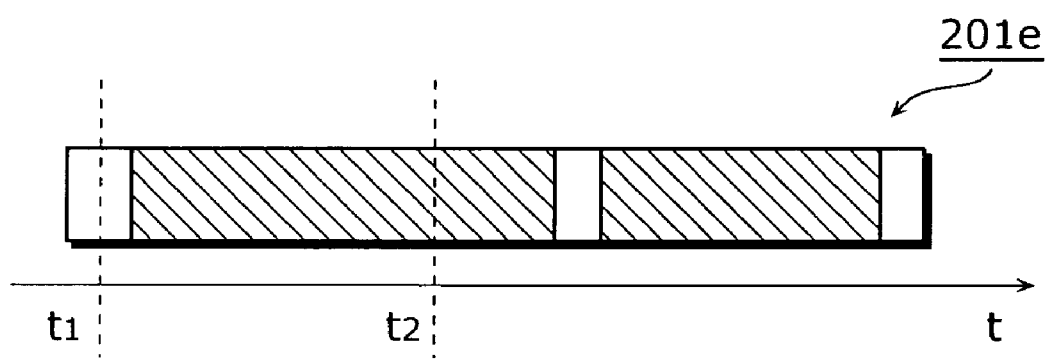
FIG. 9 is a diagram showing an example of temporal changes in a piece of copy control information of a scaled-down moving image.

FIG. 9 is a diagram showing an example of temporal changes in a piece of copy control information in the scaled-down moving image 201M. Note that the horizontal axis indicates time (t) in FIG. 9.

In a temporal change graph 201e, the diagonally shaded areas indicate "no-more-copies", and the rectangular areas other than the diagonally shaded areas indicate "copy-free".

As shown in FIG. 9, the piece of copy control information of a frame at a t1 point indicating the time after the reproduction of the scaled-down moving image 201M is started is "copy-free". In other words, the scaled-down moving image 201M at a point in time when this frame is outputted is in a state "copy-free". Furthermore, the piece of copy control information of a frame at a t2 point indicating the time after the reproduction of the scaled-down moving image 201M is started is "no-more-copies". In other words, the scaled-down moving image 201M at a point in time when this frame is outputted is in a state "no-more-copies".

The copy control information deciding unit 11 of the first recording/reproducing apparatus 1 obtains a piece of copy control information per frame of a scaled-down moving image included in an image signal outputted from the output unit 14 to an external apparatus. In other words, in the second embodiment, the copy control information deciding unit 11 functions as a control information obtaining unit in the copy control information deciding unit of the present invention.

Furthermore, the control information deciding unit 11 determines the strongest copy control information as the copy control information to be added to an image signal of a scaled-down moving image navigation screen among respective pieces of copy control information of thumbnails and frames of scaled-down moving images when the output unit 14 outputs the image signal of the scaled-down moving image navigation screen to an external apparatus.

For example, in the case where the respective pieces of copy control information added to the thumbnail image data of the thumbnails 202 to 206 are all "copy-free", when the piece of copy control information of the scaled-down moving image 201M is "no-more-copies", the piece of copy control information "no-more-copies" is added to the image signal of the scaled-down moving image navigation screen. Furthermore, when the piece of copy control information of the scaled-down moving image 201M is "copy-free", the piece of copy control information "copy-free" is added to the image signal of the scaled-down moving image navigation screen. In other words, the piece of copy control information of the scaled-down moving image 201M which varies in real time is added to the image signal as it is, and the image signal is outputted.

Furthermore, in the case where the combination of the copy control information of the thumbnails 202 to 206 is as shown in FIG. 6, as the piece of copy control information included in the thumbnail data 204a is "no-more-copies", as a result, at any points in time when the image signal of the scaled-down moving image navigation screen is outputted, the piece of copy control information "no-more-copies" is added to the image signal, and the image signal is outputted.

Even when the combination of copy control information of plural thumbnails and of a single scaled-down moving image is other than the aforementioned combinations, a single piece of copy control information is decided based on a similar rule.

Thus, the copy control information deciding unit 11 determines, as the piece of copy control information of the scaled-down moving image, the piece of copy control information which should be added to an image signal of a still image thumbnail navigation screen, in other words, the piece of copy control information of the scaled-down moving image corresponding to a point in time when a piece of representative control information is to be decided. Furthermore, the strongest copy control information among the plural pieces of copy control information including the copy control information of the scaled-down moving image is determined as the representative control information.

Note that the copy control information of audio included in the scaled-down moving image which varies in real time is added to an audio signal, and the audio signal is outputted.

In the aforementioned state, since the copy control information of the thumbnail 204 is "no-more-copies", it is assumed that the copy control information "no-more-copies" is added to the image signal of the scaled-down moving image navigation screen, and the image signal is outputted. Under such assumption, the operation of the first recording/reproducing apparatus 1 in the case where a certain image is superimposed on the scaled-down moving image navigation screen so as to cover thumbnails or a scaled-down moving image is described using FIG. 10.

Figure 10:
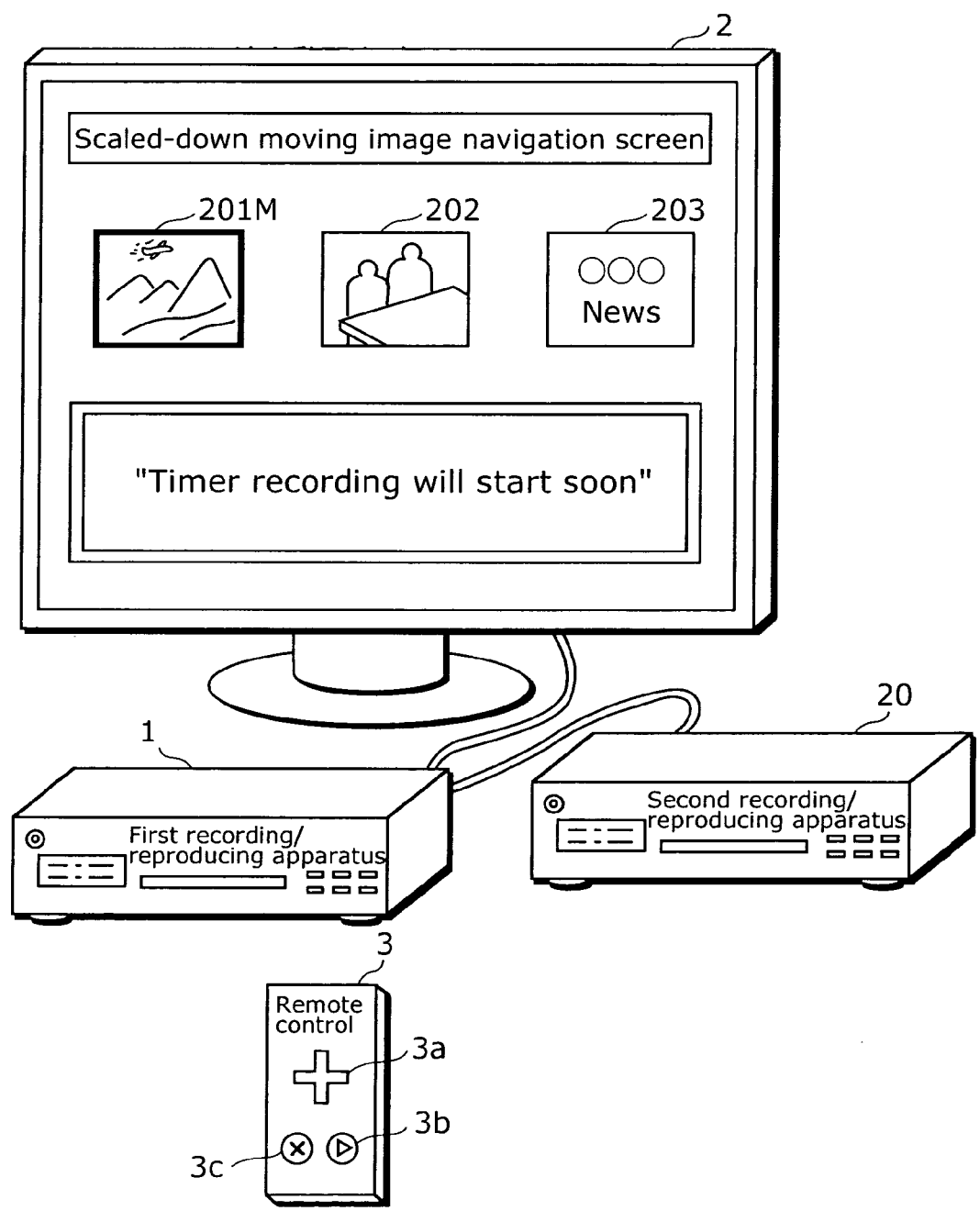
FIG. 10 is a diagram showing an example of an image display on a television in the case where a scaled-down moving image navigation screen is displayed on which a notification panel is superimposed.

FIG. 10 is a diagram showing an example of an image display on the television 2 in the case where the scaled-down moving image navigation screen is displayed on which a notification panel is superimposed.

In the first recording/reproducing apparatus 1, the notification panel generating unit 12 generates an image signal of a notification panel for notifying a user of a result of the user's operation or an alarm from an apparatus, based on the instruction from the control unit 5. The output unit 14 superimposes the generated image signal of the notification panel on the image signal of the scaled-down moving image navigation screen, and outputs it to the television 2 and second recording/reproducing apparatus 20.

For example, as shown in FIG. 10, in order to notify the user that the time to start a timer recording is approaching, the scaled-down moving image navigation screen is displayed on which the notification panel displaying that "Timer recording will start soon" is superimposed.

With this notification panel, a thumbnail or a scaled-down moving image which should be displayed is not displayed. For example, as shown in FIG. 10, the three thumbnails 204 to 206 are covered. In other words, the thumbnail image data included in the image signal outputted from the first recording/reproducing apparatus 1 are limited to thumbnail image data of the thumbnails 202 and 203 in this state. Furthermore, in addition to such thumbnail image data, the image signal includes the image signal of the scaled-down moving image 201M.

As described above, the data of the thumbnails or scaled-down moving image covered by the notification panel is not outputted. With this, there is no need to incorporate into the outputted image signal copy control information added to a thumbnail or scaled-down moving image covered in such a manner.

Therefore, the copy control information deciding unit 11 merges the copy control information of the image of the scaled-down moving image 201M which varies in real time, with the copy control information of the thumbnails 202 and 203. As shown in FIG. 6, the pieces of copy control information respectively added to the thumbnails 202 and 203 are both "copy-free". Thus, the copy control information deciding unit 11 uses, as the copy control information added to an image signal of a scaled-down moving image navigation screen, the copy control information of the scaled-down moving image 201M which varies in real time.

As a result, by outputting the image signal of the notification panel, the piece of copy control information added to the image signal of the scaled-down moving image navigation screen which is outputted to an external apparatus is changed from "no-more-copies" to the piece of copy control information which varies according to the reproduction of the scaled-down moving image 201M.

Thus, the first recording/reproducing apparatus 1 of the second embodiment can output the image signal which displays a menu of thumbnails including a scaled-down moving image by adding the respective pieces of copy control information to the thumbnails.

The copy control information is decided based on the copy control information respectively added to plural pieces of thumbnail image data included in the outputted image signal and the copy control information which varies according to the reproduction of a single scaled-down moving image.

More specifically, the strongest copy control information at a point in time when the image signal is outputted is selected among the plural pieces of copy control information and the copy control information which varies according to the reproduction of the scaled-down moving image, and the selected copy control information is added to the image signal.

With this, at a point in time when at least the copy control information of a single piece of thumbnail image data or a scaled-down moving image is "no-more-copies", the image signal becomes "no-more-copies". Therefore, the thumbnail image data or a scaled-down moving image with the "no-more-copies" status is never copied by an apparatus which is an output destination of the image data.

Furthermore, in the case where at least the copy control information of a single piece of thumbnail image data or a scaled-down moving image is "copy-one-generation" and other pieces of thumbnail image data or other scaled-down moving images are "copy-free", the image signal including such pieces of thumbnail image data or the scaled-down moving images becomes "copy-one-generation". Therefore, the thumbnail image data or the scaled-down moving image with the "copy-one-generation" status is allowed to be copied once by an apparatus which is an output destination of the thumbnail image data or the scaled-down moving image. Note that in the case where an audio signal outputted when the scaled-down moving image is reproduced does not have any effect on the notification panel to be displayed, it is outputted as it is.

With such, the first recording/reproducing apparatus 1 of the second embodiment can appropriately protect a copyright of a menu display image which displays plural scaled-down images simultaneously representing the respective contents.

Note that it is assumed on the aforementioned scaled-down moving image navigation screen that only a thumbnail selected by the user becomes a target of the reproduction of the scaled-down moving image. However, plural scaled-down moving images may be reproduced on the scaled-down moving image navigation screen.

For example, six scaled-down moving images may be reproduced simultaneously, or three scaled-down moving images may be reproduced simultaneously while the remaining three thumbnails may be still images.

With this, in the case where plural scaled-down moving images are reproduced simultaneously, the first recording/reproducing apparatus 1 can determine a piece of copy control information added to an image signal appropriately. More specifically, the copy control information deciding unit 11 reads, from each of the plural scaled-down moving images inputted from the reproducing unit 13 to the output unit 14, the copy control information each of which varies in real time. Furthermore, the copy control information deciding unit 11 merges the plural pieces of read copy control information, selects the strongest copy control information, and transmits it to the output unit 14. The output unit 14 adds, to an image signal of the scaled-down moving image navigation screen including the plural scaled-down moving images, the copy control information transmitted from the copy control information deciding unit 11, and outputs the signal to the television 2 and the second recording/reproducing apparatus 20.

Figure 11:
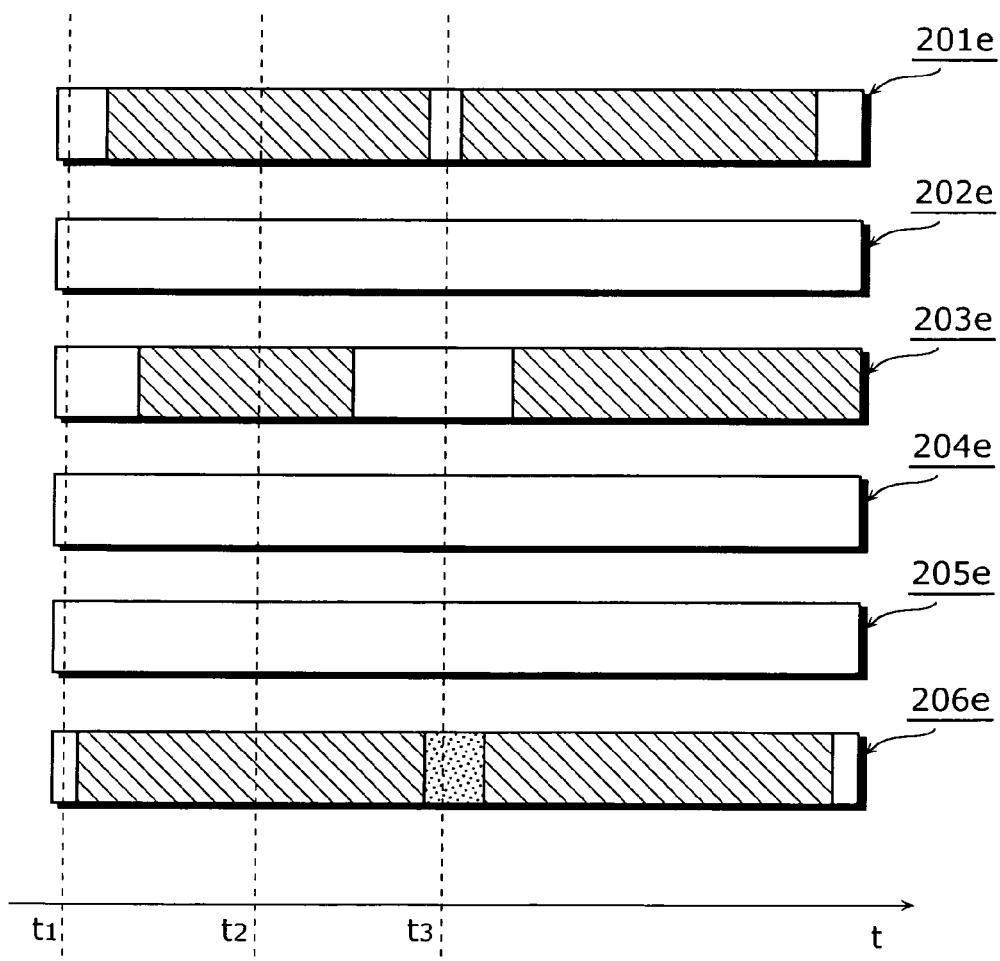
FIG. 11 is a diagram showing an example of temporal changes in respective pieces of copy control information of scaled-down moving images in the case where the six scaled-down moving images are reproduced simultaneously.

FIG. 11 is a diagram showing an example of temporal changes in respective pieces of copy control information of each scaled-down moving image in the case where six scaled-down moving images are reproduced simultaneously.

It is assumed that on the scaled-down moving image navigation screen shown in FIG. 8, respective scaled-down moving images 202M to 206M corresponding to the thumbnails 202 to 206 are reproduced in the positions of the respective thumbnails, in addition to the scaled-down moving image 201M.

The temporal change graphs 201e to 206e which are shown in FIG. 11 correspond to the scaled-down moving images 201M to 206M respectively. Furthermore, in each temporal change graph, the diagonally shaded areas indicate "no-more-copies", and a dotted area indicates "copy-one-generation". The rectangular areas, other than the diagonally shaded areas and the dotted area indicate "copy-free".

For example, in the graphs, the copy control information at the t1 point indicating the time after the reproduction of each scaled-down moving image is started is "copy-free". Thus, at this point, the copy control information "copy-free" is added to the image signal of the scaled-down moving image navigation screen, and the signal is outputted.

Furthermore, at the t2 point indicating the time after the reproduction of each scaled-down moving image is started, although the copy control information of the scaled-down moving images 202M, 204M, and 205M is "copy-free", the copy control information of other scaled-down moving images is "no-more-copies". Thus, at this point, the copy control information "no-more-copies" is added to the image signal of the scaled-down moving image navigation screen, and the signal is outputted.

Furthermore, at the t3 point indicating the time after the reproduction of each scaled-down moving image is started, the copy control information other than that of the scaled-down moving image 206M is "copy-free". Furthermore, the copy control information of the scaled-down moving image 206M is "copy-one-generation". Thus, at this point, the copy control information "copy-one-generation" is added to the image signal of the scaled-down moving image navigation screen, and the image signal is outputted.

With this, even when plural scaled-down moving images are reproduced simultaneously, the first recording/reproducing apparatus 1 can output, to an external apparatus, an image signal to which appropriate copy control information is added.

Furthermore, in the case where the display screen on which the notification panel is superimposed is displayed in the first and second embodiments, only the copy control information of a thumbnail and scaled-down moving image which are currently outputted without being covered by the notification panel are assumed to be merged.

Similarly, in the case where the screen display is scrolled, and the like, the copy control information of a thumbnail or scaled-down moving image which is displayed on the television 2 may be the target to be merged for deciding the copy control information added to the image signal.

In other words, the copy control information added to the image signal has only to be decided according to the copy control information of the data of the thumbnails or scaled-down moving images included in the image signal which is outputted to an external apparatus.

A signal of an image scrolled by the operation of the user is generated and outputted by the first recording/reproducing apparatus 1, and can indicate which thumbnails and scaled-down moving images are outputted to an external apparatus.

For example, the copy control information deciding unit 11 has only to obtain information of thumbnails and scaled-down moving images which are outputted to an external apparatus, from an image signal outputted from the output unit 14. With this, even when the image is scrolled by the user's operation, it is possible to decide the copy control information which should be added to the image signal at a point in real time.

Furthermore, in the case where the display screen on which the notification panel is superimposed is displayed in the first and second embodiments, when an entire thumbnail or a scaled-down moving image is covered by the notification panel, the copy control information of the thumbnail or scaled-down moving image is assumed to be excluded from the target of the merge for deciding the copy control information added to the image signal.

However, even when a part of a thumbnail or scaled-down moving image is covered by a notification panel, the copy control information of the thumbnail or scaled-down moving image may be excluded from the target of merge. Alternatively, whether or not the thumbnail or scaled-down moving image becomes the target of a merge may be decided depending on a ratio of the thumbnail or scaled-down moving image which is displayed without being covered by the notification panel.

For example, in the case where the ratio of a total display area where a thumbnail is not covered by the notification panel is 20% or more, the rule that respective copy control information of the thumbnails are to be merged may be set.

Furthermore, in the case where the notification panel is transparent, the image under the notification panel increases its ratio to be displayed in proportion to a degree of transparency for the notification panel. Therefore, in the case where the image under the notification panel is not completely invisible, depending on the degree of transparency for the notification panel, whether or not the image is to be merged may be decided.

For example, in the case where the degree of transparency for the notification panel is 50% or more, the rule that the copy control information of the thumbnail under the notification panel is to be merged may be set.

Furthermore, both a ratio at which a thumbnail or a scaled-down moving image is displayed without being covered by a notification panel and a degree of transparency for the notification panel are simultaneously considered, and with the result, whether or not the thumbnail or scaled-down moving image is to be merged may be decided.

Furthermore, the copyright owner of the content including thumbnails or scaled-down moving images may determine a ratio at which a thumbnail or a scaled-down moving image is displayed without being covered by a notification panel and a degree of transparency for the notification panel which are criteria with which copy control information of a thumbnail or scaled-down moving image is to be merged. In this case, by adding the information, such as the aforementioned ratio decided by the copyright owner, to the content data, the copy control information deciding unit 11 may determine whether or not the copy control information of the thumbnail or scaled-down moving image is to be merged based on the information.

With this, by determining copy control information added to an outputted image signal, depending on a substantial display mode of a thumbnail or a scaled-down image which is a scaled-down moving image, it is possible to more substantially protect copyrights of image signals including data of scaled-down images.

Furthermore, the thumbnail obtaining unit 9 of the first recording/reproducing apparatus 1 extracts thumbnail image data included in the content data in advance (refer to FIG. 4). However, when an image signal of a still image thumbnail navigation screen or a scaled-down moving image navigation screen is outputted, the thumbnail obtaining unit 9 may extract data of a still image from the substance data of the content, and make the still image a thumbnail which outputs the still image to an external apparatus.

For example, the thumbnail obtaining unit 9 may extract, from substance data of each content, a still image which is reproduced in 5 seconds after the reproduction of the content is started. Furthermore, in each content data, a point in time when the still image is extracted may be defined by a predetermined time after the reproduction is started as described above, or may be designated per content.

With this, each time a thumbnail is outputted, when the data of a still image which becomes a thumbnail is extracted from the substance data, the copy control information corresponding to the still image data may be extracted at the same time. For example, in FIG. 5, in the case of the still image data at the to point indicating the time after reproduction is started, the copy control information "copy-free" is also extracted with the still image data.

With this, even when the content handled by the first recording/reproducing apparatus 1 is content in which the data format is not a data format in which the content includes image data of a thumbnail and the copy control information separately from the substance data of the content, it is possible to appropriately protect a copyright of the image data included in the content.

Furthermore, in the case where the moving image content is data compressed by the Moving Picture Experts Group (MPEG) format and the extracted frame as a thumbnail is a P picture or B picture, for example, the previous I picture may be extracted as a thumbnail.

Furthermore, as shown in FIG. 5, and the like, copy control information is added per frame that constitutes a moving image in the content handled by the first recording/reproducing apparatus 1. However, copy control information may not be added per frame. For example, it may be added per block made up of plural frames. Furthermore, a single piece of copy control information may be added to a content when the copy control information of the content does not have to vary in real time according to the reproduction. In other words, the copy control information of each image included in the scaled-down moving image has only to be identified.

Whatever the case, for example, the thumbnail obtaining unit 9 has only to identify the copy control information corresponding to a frame obtained as a thumbnail, depending on a unit basis each added with copy control information. Furthermore, for example, the copy control information deciding unit 11 has only to identify the copy control information corresponding to each frame of a scaled-down moving image outputted to an external apparatus by the output unit 14, depending on a unit basis each added with copy control information.

In other words, regardless of a unit basis of data each added with copy control information, as long as copy control information per image data included in the substance data can be identified in the content, the first recording/reproducing apparatus 1 of the first and second embodiments can appropriately protect a copyright of the image data included in the content.

Furthermore, the content handled by the first recording/reproducing apparatus 1 is moving image content.

However, the content handled by the first recording/reproducing apparatus 1 may be content which includes only still images. When an image is extracted from the content, the content has only to be content which can contain the copy control information of the image, together with the image.

Furthermore, the output unit 14 of the first recording/reproducing apparatus 1 adds copy control information to an image signal to be outputted and outputs the image signal. However, the copy control information does not have to be added before outputting the image signal, or at least, the image signal to be outputted has only to be associated with the copy control information so as to be synchronized with each other. In this case, for example, the external apparatus which receives the associated image signal and the copy control information may relate the image signal to the copy control information.

Furthermore, as an example of the copy control information deciding apparatus of the present invention, a recording/reproducing apparatus which records and reproduces contents is used for describing the present invention. However, the copy control information deciding apparatus of the present invention may be embodied by an apparatus other than apparatuses which record/reproduce contents.

For example, the copy control information deciding apparatus of the present invention may be embodied as a set top box which is an apparatus that is connected to a household television and provides additional functions, such as a control box which receives a broadcast program for cable television.

Furthermore, the copy control information deciding apparatus of the present invention may not be in a mode which reads content data from a storage device provided inside, as the first recording/reproducing apparatus 1 of the first and second embodiments. For example, it may be embodied as a reproducing apparatus which reads content data from a storage medium, such as a DVD, a Blu-ray Disc, or a semiconductor memory.

In other words, the copy control information deciding apparatus of the present invention has a function of obtaining copy control information of a still image or a moving image included in the respective contents from plural pieces of content data. Furthermore, it has a function of determining copy control information added to an image signal including plural still images or scaled-down images of moving images based on the plural pieces of obtained copy control information. Furthermore, it has a function of outputting the determined copy control information. With these functions, it is possible to appropriately protect a copyright of an image on which plural scaled-down images representing the respective contents are displayed simultaneously.

Thus, the copy control information deciding apparatus of the present invention may be embodied by an apparatus which does not include contents by itself, such as the aforementioned set top box or a reproducing apparatus in a recording medium. In this case, the data format of a content may be a data format in which the content includes image data of a thumbnail separately from the substance data of the content, or the data format requiring extracting image data which becomes a thumbnail from the substance data.

Furthermore, copy control information is one of the following pieces of information, "copy-free", "copy-one-generation", and "no-more-copies". However, as long as the piece of information is related to copy restriction, information other than the aforementioned pieces of information may be used. In such a case, the strength order of copy control information has only to be identified based on the copyright protection function included in such piece of copy control information. Furthermore, plural pieces of copy control information and information related to the respective orders have only to be stored in the copy control information deciding unit 11. The copy control information deciding unit 11 has only to determine a piece of representative control information based on the information.

Furthermore, in the case where conditions are attached to copy control information, such as time limitation and limitation in types of reproducing apparatuses, for example, the copy control information deciding unit 11 has only to obtain information for considering the conditions, such as a date or the type of a reproducing apparatus, and to determine a piece of representative control information.

In other words, the copy control information deciding unit has only to determine representative control information in consideration of necessary conditions based on copy control information of a scaled-down image included in a menu display image.

With this, even when the copyright protection of a content, specifications related to a data format, or the like, varies depending on the region or era, the first recording/reproducing apparatus 1 can appropriately operate.

Furthermore, in the case where copy control information of a thumbnail or a scaled-down image which is a scaled-down moving image can not be identified, such as a case where no control information is included in the content data, for example, the copy control information of the scaled-down image obtained from the content may be handled as "no-more-copies".

With this, even when whether or not the content can be copied cannot be identified, it is possible to provide the first recording/reproducing apparatus 1 which safely operates in terms of copyright protection.

Furthermore, the content data processed by the first recording/reproducing apparatus 1 may not be digital data. For example, there are cases where copy control information is embedded and transmitted in a blanking period of a broadcast wave in analog broadcasting. In this case, for example, the data processing unit 7 or the thumbnail obtaining unit 9 has only to extract the copy control information embedded in the broadcast wave, and associate the copy control information with the image data included in the broadcast wave. The same method can be applied when copy control information is added to a broadcast wave as a digital watermark.

In other words, as long as copy control information related to an image to be received and outputted can be obtained, the content data may be digital data or analog data.

With this, a copyright of a menu image which displays scaled-down images obtained from analog content data can be appropriately protected by adapting the first recording/reproducing apparatus 1 to the analog content data.

Furthermore, the first and second embodiments describe the case where the number of thumbnails and scaled-down moving images to be simultaneously displayed on the television 2 is six. However, the present invention is not limited to this number, and the copyright of the image outputted to an external apparatus can be protected even when the number is arbitrary.

For example, when a single thumbnail or a single scaled-down moving image is displayed, the copy control information is decided according to the rule described in the first and second embodiments of the present invention. More specifically, the copy control information of the displayed single thumbnail or the copy control information of the displayed single moving image which varies in real time is added to an outputted image signal.

Furthermore, for example, even in the case where six or more thumbnails are displayed simultaneously, the copy control information deciding unit 11 has only to merge the respective pieces of copy control information of these thumbnails.

With this, for example, the copyright of the menu image can be protected in the recording/reproducing apparatus having a specification in which the number of thumbnails and scaled-down moving images to be displayed on a menu can be modified by the user.

Furthermore, there are cases where a part of or all units in the first recording/reproducing apparatus 1 shown in FIG. 3 are embodied by the combination of each unit as an LSI which is an integrated circuit. These may be made into a single chip, or part of or all of the units may be made into separate chips.

Figure 12:
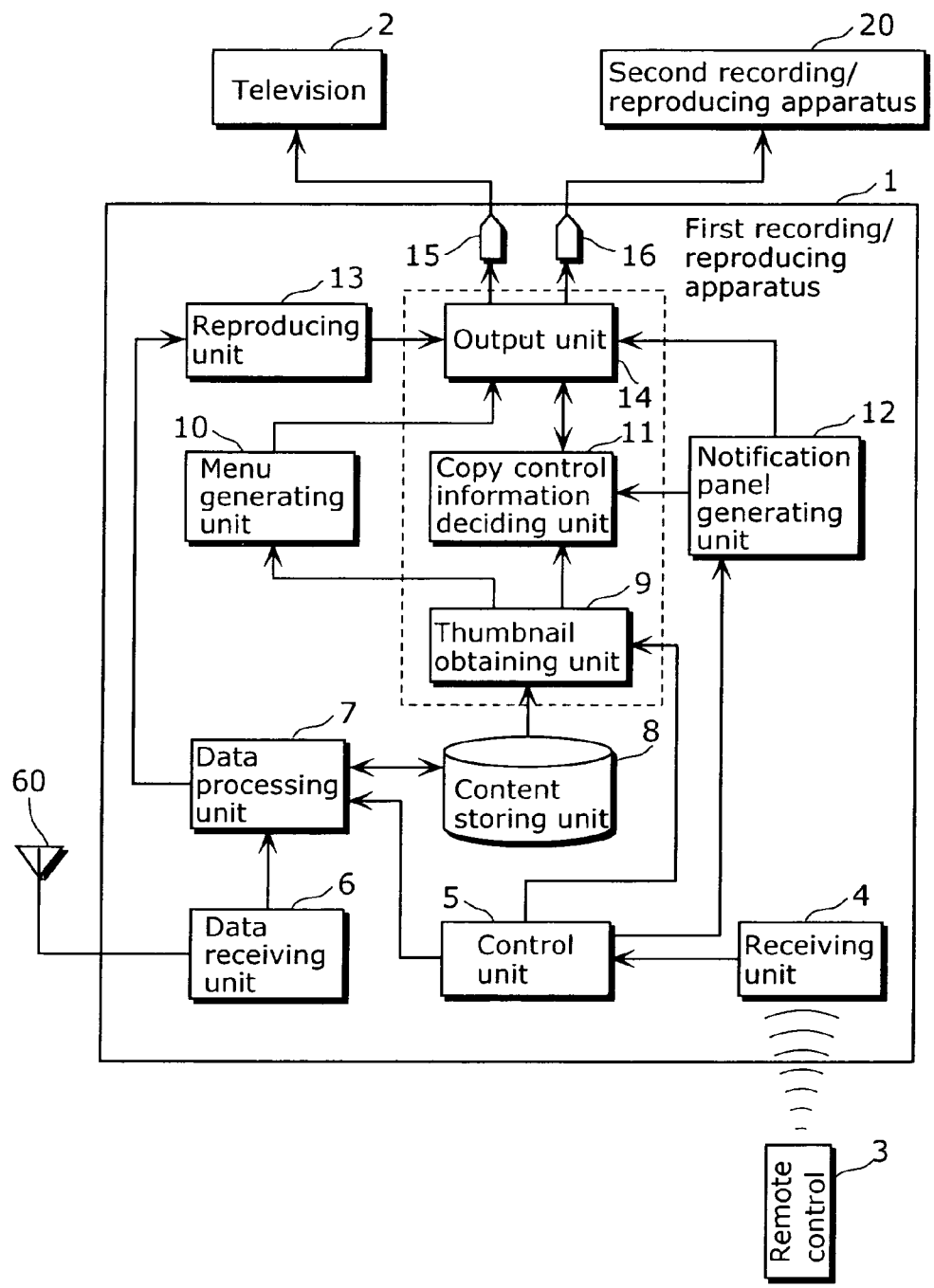
FIG. 12 is a diagram showing an example of the range of units realized as an integrated circuit in the first recording/reproducing device 1 of the first and second embodiments.

FIG. 12 is a diagram showing an example of the range of units embodied as an integrated circuit in the first recording/reproducing apparatus 1 of the first and second embodiments. The range enclosed by a dotted line in the diagram shows an example of the range of units realized as an integrated circuit. In other words, the copy control information deciding apparatus of the present invention may be embodied as an integrated circuit such as an LSI.

The copy control information deciding apparatus of the present invention can determine and output appropriate copy control information when an image signal for displaying plural thumbnails or scaled-down moving images on a screen. Thus, it can be applied to a recording/reproducing apparatus or a set top box which requires a function related to copyright protection.

The invention claimed is:

1. A copy control information deciding apparatus comprising:
   a control information obtaining unit operable to obtain plural pieces of copy control information, the plural pieces of the copy control information being respective pieces of copy control information of plural scaled-down images which are to be displayed in a menu simultaneously;
   a deciding unit operable to determine a piece of representative control information as a piece of copy control information of a menu display image in which the plural scaled-down images are to be displayed as a menu, based on the plural pieces of the copy control information obtained by said control information obtaining unit, the piece of the representative control information being one of the plural pieces of the copy control information; and
   an output unit operable to output the piece of the representative control information determined by said deciding unit, in relation to the menu display image,
   wherein said deciding unit determines a piece of the copy control information of the plural pieces of the copy control information having a strongest copyright protection function among the plural pieces of the copy control information as the piece of the representative control information.

2. The copy control information deciding apparatus according to claim 1,
   wherein each piece of copy control information of the plural pieces of the copy control information is one of copy-free, copy-one-generation, and no-more-copies, each piece of the copy control information having a copyright protection function,
   wherein the copy-one-generation has a stronger copyright protection function than the copy-free, and
   wherein the no-more-copies has a stronger copyright protection function than the copy-one-generation.

3. The copy control information deciding apparatus according to claim 1,
   wherein at least one scaled-down image of the plural scaled-down images is a scaled-down moving image generated by scaling down a moving image to produce scaled-down images constituting the scaled-down moving image, and
   wherein respective pieces of copy control information of the plural pieces of copy control information corresponding to scaled-down images that constitute the scaled-down moving image are identified.

4. The copy control information deciding apparatus according to claim 1, further comprising
   an image signal obtaining unit operable to obtain a signal of the menu display image,
   wherein said output unit is further operable to add the piece of the representative control information to the signal of the menu display image obtained by said image signal obtaining unit, and to output a signal with the piece of the representative control information added to the signal of the menu display image.

5. The copy control information deciding apparatus according to claim 4,
   wherein said image signal obtaining unit is further operable to obtain a signal of a sub-image which is to be displayed by being superimposed on a part of the menu display image,
   wherein said output unit is further operable to output a signal of the sub-image superimposed on the menu display image,
   wherein said deciding unit is further operable to determine the piece of the representative control information based on respective pieces of copy control information of the plural pieces of the copy control information corresponding to scaled-down images of the plural scaled-down images which are displayed without being covered by the sub-image, and
   wherein each of the scaled-down images which are displayed without being covered by the sub-image is an image in which a predetermined ratio or more of an entirety of the image is to be displayed.

6. The copy control information deciding apparatus according to claim 5,
   wherein the predetermined ratio depends on at least one of a positional relationship between the sub-image and the image, and a degree of transparency of the sub-image.

7. The copy control information deciding apparatus according to claim 1,
wherein a scaled-down image of the plural scaled-down images represents a content stored in a storage medium,
wherein the content includes substance data of the content, a still image which is the scaled-down image, and a piece of copy control information of the still image, which are associated with one another, and
wherein said control information obtaining unit is further operable to obtain the piece of the copy control information from the storage medium.

8. The copy control information deciding apparatus according to claim 1,
wherein a scaled-down image of the plural scaled-down images represents a content stored in a storage medium,
wherein the content includes substance data of the content,
wherein the substance data includes one or more images including an image from which the scaled-down image is generated, and respective pieces of copy control information corresponding to the one or more images, and
wherein said control information obtaining unit is further operable to obtain a piece of copy control information of the respective pieces of the copy control information corresponding to the image from which the scaled-down image is generated from the substance data of the content which is stored in the storage medium.

9. The copy control information deciding apparatus according to claim 1, further comprising
a receiving unit operable to receive a content which is a broadcast program,
wherein a scaled-down image of the plural scaled-down images represents the content received by said receiving unit,
wherein the content includes substance data of the content, a still image which is the scaled-down image, and a piece of copy control information of the still image, which are associated with one another, and
wherein said control information obtaining unit is further operable to obtain the piece of the copy control information received by said receiving unit.

10. The copy control information deciding apparatus according to claim 1, further comprising
a receiving unit operable to receive a content which is a broadcast program,
wherein the content includes substance data of the content,
wherein the substance data includes one or more images including an image from which the scaled-down image is generated, and respective pieces of copy control information corresponding to the one or more images, and
wherein said control information obtaining unit is further operable to obtain a piece of copy control information of the respective pieces of the copy control information corresponding to the image from which the scaled-down image is generated from the substance data of the content received by said receiving unit.

11. The copy control information deciding apparatus according to claim 1,
wherein at least one scaled-down image of the plural scaled-down images is a scaled-down moving image generated by scaling down a moving image to produce scaled-down images constituting the scaled-down moving image, and
wherein said deciding unit is further operable to determine a piece of copy control information of a scaled-down image of the scaled-down images constituting the scaled-down moving image as a piece of copy control information of the moving image corresponding to a point in time when the piece of the representative control information is to be determined.

12. A copy control information deciding method comprising:
an obtaining step of obtaining plural pieces of copy control information, the plural pieces of the copy control information being respective pieces of copy control information of plural scaled-down images which are to be displayed in a menu simultaneously;
a deciding step of determining a piece of representative control information as a piece of copy control information of a menu display image in which the plural scaled-down images are to be displayed as a menu, based on the plural pieces of the copy control information obtained in said obtaining step, the piece of the representative control information being on eof the plural pieces of the copy control information; and
an output step of outputting the piece of the representative control information determined said deciding step, in relation to the menu display image,
wherein in said deciding step a piece of the copy control information of the plural pieces of the copy control information having a strongest copyright protection function among the plural pieces of the copy control information is determined as the piece of the representative control information.

13. A computer-readable recording medium storing a program therein, the program for causing a computer to execute:
an obtaining step of obtaining plural pieces of copy control information, the plural pieces of the copy control information being respective pieces of copy control information of plural scaled-down images which are to be displayed in a menu simultaneously;
a deciding step of determining a piece of representative control information as a piece of copy control information of a menu display image in which the plural scaled-down images are to be displayed as a menu, based on the plural pieces of the copy control information obtained in said obtaining step, the piece of the representative control information being one of the plural pieces of the copy control information; and
an output step of outputting the piece of the representative control information determined in said deciding step, in relation to the menu display image,
wherein in said deciding step a piece of the copy control information of the plural pieces of the copy control information having a strongest copyright protection function among the plural pieces of the copy control information is determined as the piece of the representative control information.

* * * * *

UNITED STATES PATENT AND TRADEMARK OFFICE
CERTIFICATE OF CORRECTION

PATENT NO. : 7,657,847 B2 Page 1 of 1
APPLICATION NO. : 11/628491
DATED : February 2, 2010
INVENTOR(S) : Kei Ichikawa et al.

It is certified that error appears in the above-identified patent and that said Letters Patent is hereby corrected as shown below:

In the Claims

In column 24, line 24, (claim 12, line 14), "being on eof the" should read --being one of the--.

Signed and Sealed this

Twenty-second Day of June, 2010

David J. Kappos
*Director of the United States Patent and Trademark Office*